(12) United States Patent
Bacci et al.

(10) Patent No.: US 7,776,986 B2
(45) Date of Patent: Aug. 17, 2010

(54) BUTENE-1 (CO)POLYMERS HAVING LOW ISOTACTICITY

(75) Inventors: Dino Bacci, Pordenone (IT); Friederike Morhard, Bangkok (TH); Fabrizio Piemontesi, Ferrara (IT); Maria Silvia Tonti, Ferrara (IT); Gianni Vitale, Ferrara (IT); Giampiero Morini, Padova (IT); Anteo Pelliconi, Occhiobello (IT)

(73) Assignee: Basell Poliolefine Italia s.r.l., Milan (IT)

( * ) Notice: Subject to any disclaimer, the term of this patent is extended or adjusted under 35 U.S.C. 154(b) by 623 days.

(21) Appl. No.: 11/665,630

(22) PCT Filed: Oct. 12, 2005

(86) PCT No.: PCT/EP2005/055180

§ 371 (c)(1),
(2), (4) Date: Apr. 17, 2007

(87) PCT Pub. No.: WO2006/042815

PCT Pub. Date: Apr. 27, 2006

(65) Prior Publication Data

US 2008/0004409 A1    Jan. 3, 2008

Related U.S. Application Data

(60) Provisional application No. 60/620,977, filed on Oct. 21, 2004.

(30) Foreign Application Priority Data

Oct. 18, 2004   (EP) .................................. 04105128

(51) Int. Cl.
C08F 10/08 (2006.01)
C08F 4/50 (2006.01)
C08F 4/52 (2006.01)
C08F 4/643 (2006.01)

(52) U.S. Cl. ................. 526/348.6; 526/348; 526/123.1; 526/124.2; 526/124.3; 526/65

(58) Field of Classification Search ............. 526/348.6, 526/124.2, 124.3, 123.1
See application file for complete search history.

(56) References Cited

U.S. PATENT DOCUMENTS

| | | | |
|---|---|---|---|
| 4,298,718 A | 11/1981 | Mayr et al. | |
| 4,298,722 A * | 11/1981 | Collette et al. | 526/348.6 |
| 4,399,054 A | 8/1983 | Ferraris et al. | |
| 4,469,648 A | 9/1984 | Ferraris et al. | |
| 4,495,338 A | 1/1985 | Mayr et al. | |
| 6,048,818 A * | 4/2000 | Morini et al. | 502/127 |
| 6,306,996 B1 * | 10/2001 | Cecchin et al. | 526/348.6 |
| 6,559,252 B1 | 5/2003 | Horton et al. | |
| 6,608,224 B2 | 8/2003 | Resconi et al. | |
| 6,841,501 B2 | 1/2005 | Resconi et al. | |
| 6,878,786 B2 | 4/2005 | Resconi et al. | |
| 6,930,190 B2 | 8/2005 | Nifant'ev et al. | |
| 6,949,614 B1 | 9/2005 | Schottek et al. | |
| 6,953,829 B2 | 10/2005 | Kratzer et al. | |
| 6,998,458 B2 * | 2/2006 | Vitale et al. | 526/348.6 |
| 7,074,864 B2 | 7/2006 | Resconi | |
| 7,101,940 B2 | 9/2006 | Schottek et al. | |
| 7,112,638 B2 | 9/2006 | Nifant'ev et al. | |
| 7,141,527 B1 | 11/2006 | Van Baar et al. | |
| 7,166,683 B2 | 1/2007 | Resconi | |
| 2004/0132612 A1 | 7/2004 | Resconi et al. | |
| 2004/0254315 A1 | 12/2004 | Resconi | |
| 2006/0094840 A1 | 5/2006 | Resconi et al. | |
| 2006/0235173 A1 | 10/2006 | Resconi | |

FOREIGN PATENT DOCUMENTS

| | | |
|---|---|---|
| DE | 2241412 | 3/1974 |
| DE | 19917985 | 10/2000 |
| DE | 19962814 | 6/2001 |
| DE | 19962910 | 7/2001 |
| EP | 172961 | 3/1986 |
| EP | 186968 | 7/1986 |
| EP | 395083 | 10/1990 |
| EP | 442412 | 8/1991 |
| EP | 553805 | 8/1993 |

(Continued)

OTHER PUBLICATIONS

H. N. Cheng, "$^{13}$C NMR Analysis of Propylene-Butylene Copolymers by a Reaction Probability Model," *Journal of Polymer Science: Polymer Physics Edition*, vol. 21, vol. 573-581 (1983).

(Continued)

*Primary Examiner*—Rip A. Lee
(74) *Attorney, Agent, or Firm*—William R. Reid

(57) ABSTRACT

Butene-1 (co)polymers characterized by the following properties:
  content of butene-1 units in the form of isotactic pentads (mmmm) from 25 to 55%;
  intrinsic viscosity [η] measured in tetraline at 135° C. from 1 to 3 dL/g;
  content of xylene insoluble fraction at 0° C. from 3 to 60%; and
a ratio $ES_2/ES_1 \geq 1$, where $ES_1$ is the boiling diethyl ether soluble fraction determined on the polymer as such and $ES_2$ is the boiling diethyl ether soluble fraction determined after milling the polymer.

The butene-1 (co)polymers show a good balance between processability and elastomeric behavior.

13 Claims, No Drawings

FOREIGN PATENT DOCUMENTS

| | | |
|---|---|---|
| EP | 553806 | 8/1993 |
| EP | 601525 | 6/1994 |
| EP | 775707 | 5/1997 |
| WO | 82/00826 | 3/1982 |
| WO | 91/02012 | 2/1991 |
| WO | 92/00333 | 1/1992 |
| WO | 99/21899 | 5/1999 |
| WO | 99/45043 | 9/1999 |
| WO | 01/21674 | 3/2001 |
| WO | 01/47939 | 7/2001 |
| WO | 01/62764 | 8/2001 |
| WO | 02/14384 | 2/2002 |
| WO | 02/100908 | 12/2002 |
| WO | 02/100909 | 12/2002 |
| WO | 02/102811 | 12/2002 |
| WO | 03/014107 | 2/2003 |
| WO | 03/042258 | 5/2003 |
| WO | 2004/005360 | 1/2004 |
| WO | 2004/099269 | 1/2004 |
| WO | 2005/095468 | 10/2005 |
| WO | 2006/045687 | 5/2006 |

OTHER PUBLICATIONS

T. Asakura et al., "Carbon-13 NMR Spectral Assignment of Five Polyolefins Determined from the Chemical Shift Calculations and the Polymerization Mechanism," *Macromolecules,* vol. 24(9), p. 2334-2340 (1991).

R. Chûjô et al., "Two-site model analysis of $^{13}$C n.m.r. of polypropylene polymerized by Ziegler-Natta catalyst with external alkoxysilane donors," *Polymer,* vol. 35(2), p. 339-342 (1994).

V. Busico et al., "Regiospecificity of 1-butene polymerization catalyzed by $C_2$-symmetric group IV metallocenes," *Macromol. Rapid Commun.,* vol. 16, p. 269-274 (1995).

L. Resconi et al., "1-Olefin Polymerization at Bis(pentamethylcyclopentadienyl)zirconium and -hafnium Centers: Enantioface Selectivity," *Macromolecules* vol. 25(25), p. 6814-6817 (1992).

\* cited by examiner

BUTENE-1 (CO)POLYMERS HAVING LOW ISOTACTICITY

This application is the U.S. national phase of International Application PCT/EP2005/055180, filed Oct. 12, 2005, claiming priority to European Patent Application 04105128.5 filed October 18, 2004, and the benefit under 35 U.S.C. 119(e) of U.S. Provisional Application No. 60/620,977, filed Oct. 21, 2004; the disclosures of International Application PCT/EP2005/055180, European Patent Application 04105128.5 and U.S. Provisional Application No. 60/620,977, each as filed, are incorporated herein by reference.

The present invention relates to specific butene-1 (co)polymers having low isotacticity and elastomeric behavior. In addition, the present invention also relates to the polymer compositions containing said butene-1 (co)polymers.

Certain butene-1 (co)polymers having low isotacticity and elastomeric behavior are known in the art. They can be used as components of blends with other polyolefins, or polymeric products, in order to modulate particular properties such as sealing strength, flexibility and softness of the plastic materials. In particular, these butene-1 (co)polymers can be used as additives in production of roofing boards, road surfacing materials, and sealing compositions or used as oil viscosity improvers. In order to be used for these purposes, important characteristics are good processability and a suitable compromise between plastic and elastomeric properties that, in turn, derives from a good balance between the crystalline and amorphous fractions of the polymer. DE 2241412 describes the preparation of a low stereoregularity polybutene carried out by polymerizing butene-1 with a $TiCl_3$-based catalyst. According to this document, the original stereospecificity of this catalyst has been lowered by using Al-trialkyl compounds as cocatalysts in specific Al:Ti molar ratios. Notwithstanding that, the contribution of the more crystalline fraction is still too high. In fact, when taking into consideration the polymers having a processable molecular weight, it can be seen that the elastomeric properties are not satisfactory when referred to the amounts of ether solubles.

EP 186968 discloses a highly stereoregular thermoplastic polybutene-1 characterized by more pronounced elastomeric properties with respect to conventional isotactic polybutene-1. This polybutene-1 is obtained by the use of a Ziegler-Natta catalyst system comprising (a) a solid component including a Ti compound and a benzoate internal donor supported on $MgCl_2$; (b) an alkylaluminum compound as cocatalyst and (c) p-ethylanisate as the external electron-donor compound. However, also in this case the high content of isotactic sequences still affects the properties of the polymer as clearly shown by the low amount of ether soluble fraction and the relatively high value of the tensile strength at yield.

In U.S. Pat. No. 4,298,722 is reported the preparation of a fractionable elastomeric polybutene-1 obtained by polymerizing butene-1 in the presence of a catalyst which is the reaction product of an organometallic compound of formula $(RCH_2)_4M$, where M is Ti, Zr or Hf and R is aryl, aralkyl or tertiary alkyl, with the partially hydrated surface of a metal oxide such as $Al_2O_3$, $TiO_2$, $SiO_2$ or mixtures thereof. The polymer obtained directly from the polymerization has a very high intrinsic viscosity that makes it not processable with the conventional apparatuses and prevents any use in the preparation of polymer compositions. The intrinsic viscosity is reduced by heating and milling the polymer, but this involves, at the same time, even a reduction of the ether soluble fraction with the consequent worsening of the elastomeric properties. Therefore, in order to meet both a proper viscosity range and final elastomeric properties, the polymer before milling must contain a very high amount of ether soluble fraction. At these level however, certain mechanical properties may be no longer suitable for certain applications.

It is therefore still felt the need of a polybutene-1 (co) polymer having low isotacticity and a suitable balance between elastomeric properties (compression set, elongation at break) and those connected to the more crystalline fraction (tensile stress at break, or at yield).

The applicant has now found butene-1 (co)polymers possessing such a good balance and characterized by the following properties:

content of butene-1 units in the form of isotactic pentads (mmmm) from 25 to 55%;

intrinsic viscosity [η] measured in tetraline at 135° C. from 1 to 3 dL/g;

content of xylene insoluble fraction at 0° C. from 3 to 60%; and a ratio $ES_2/ES_1 \geq 1$, where $ES_1$ is the amount of boiling diethyl ether soluble fraction determined on the polymer as such and $ES_2$ is the amount of boiling diethyl ether soluble fraction determined after milling the polymer according to method described below.

In particular, the butene-1 (co)polymers object of the present invention are endowed with the following features:

content of boiling diethyl ether soluble fraction ($ES_1$) from 20 to 75% of the total weight, preferably from 30 to 65%, particularly from 35 to 60%;

content of butene-1 units in the form of isotactic pentads (mmmm) from $\geq 30$ to 50% and preferably from 32 to 45%;

intrinsic viscosity [η] measured in tetraline at 135° C. from 1.5 to 3 dL/g and preferably from 1.7 to 2.8 dL/g;

content of xylene insoluble fraction at 0° C. from 5 to 50% of the total weight of the polymer.

In a preferred aspect of the present invention the butene-1 (co)polymers additionally possess one or more of the following properties:

Molecular weight distribution (Mw/Mn) measured according to the method specified below, ranging from 3.5 to 9; more preferably ranging from 4 to 8 and in particular in the range 4-7;

Heat of fusion (ΔH) measured via Differential Scanning Calorimetry (DSC) lower than 10 J/g and melting temperature (Tm) lower than 106° C. preferably lower than 103° C. and more preferably lower than 100° C. In some cases the melting point can even be absent.

Compression Set (25% -22 hours) lower than 90%, preferably lower than 80 and more preferably lower than 50, and Stress at break in the range of higher than 6 preferably from 6.5 to 20 Mpa.

The Shore A value is generally lower than 80 and in certain cases lower than 60. In view of these properties, the butene-1 (co)polymers of the invention can be used in particular as components of polymeric compositions for use in applications where a certain level of softness is required.

As shown by the intrinsic viscosity range mentioned above, the molecular weight of the polymers of the invention is substantially in the range that makes the said butene-1 copolymers processable with the conventional devices. Preferably the Melt Index measured according to ASTM D1238 condition E is comprised in the range of from 0.1 to 100 g/10', more preferably from 0.1 to 10 g/10'.

The butene-1 (co)polymers of the invention may contain other olefins of formula $CH_2=CHR$ where R is H or a C1-C10 alkyl different from ethyl. Use in particular of ethylene, propylene and hexene-1 or mixtures thereof as comonomer(s) is preferred. The amount of additional olefin(s) in the polymers of the present invention preferably ranges from 0.1 to 20% by mol, more preferably from 0.5 to 15% by mol.

The butene-1 (co)polymers of the present invention are also characterized by the fact that when analyzed via NMR with the apparatus and procedure set forth below, the signals of 4,1 inserted butene units are absent.

As mentioned before, the polymers of the present invention can be used as such, or preferably as components in blends with other polymers in a wide range of applications such as polymer compositions for use in low seal initiation temperature, compositions for fiber applications, for roofing boards, and for road surfacing. Due to their elastomeric properties the butene-1 (co)polymers may be even used without plasticizer in replacement of flexible vinyl polymers, such as highly plasticized poly(vinylchloride), or some SEBS compounds.

Therefore, it constitutes a further object of the present invention a polymer composition comprising:
(A) from 1 to 99% by weight of the butene-1 (co)polymer object of the present invention; and
(B) from 99% to 1% by weight of another polymeric component;

said percentages being based on the sum of (A)+(B).

In particular, (A) can be present in an amount ranging from 10 to 90% and (B) in an amount ranging from 90% to 10%. Preferably, the component (B) comprises an olefin (co)polymer. In particular the component (B) can be selected from ethylene (co)polymers, propylene (co)polymers, butene-1 (co)polymers and mixtures thereof.

Particularly interesting are the polymer compositions comprising:
(A) from 5 to 40% wt of the butene-1 (co)polymers of the present invention; and
(B) from 60 to 95% wt of a propylene copolymer containing from 1 to 30% by mol of ethylene and/or an a-olefin of formula $CH_2=CHR$, where R is a C2-C10 hydrocarbon group; said percentages being based on the sum of (A)+(B).

Preferably, said α-olefin is butene-1. Particularly interesting are the compositions in which (B) is selected from (a) a propylene copolymer containing both ethylene and butene-1 wherein the content of ethylene is from 1 to 10% and the content of butene-1 is from 1 to 10% and (b) a propylene copolymer containing from 2 to 15% by mol of butene-1.

Said compositions, which are particularly useful in applications where a low seal initiation temperature (SIT) is required, show good fluidity and transparency while maintaining acceptable mechanical properties.

The butene-1 copolymers and the compositions which are the object of the present invention can be subjected to vulcanization or crosslinking in order to produce thermoplastic elastomeric compositions with enhanced elastomeric behaviour.

The terms vulcanization and crosslinking comprise both the actual crosslinking or vulcanization and the reaction by means of which the grafting among the chains of the butene-1 (co)polymer can take place as a result of the reaction promoted by the crosslinking system used.

Among the various vulcanization techniques known in the art, the preferred technique is dynamic vulcanization. When working according to this technique, the polymers of the invention are subjected to kneading or to other shear forces in the presence of crosslinking agents and, if appropriate, coadjuvants thereof. While the usual temperature range for vulcanization is between 140 and 240° C., it has been surprisingly found that for polybutenes having Shore D lower than 50 and preferably lower than 40, and in particular for the polybutenes of the present invention, the crosslinking process is carried out at temperatures ranging between 100 and 150° C. Accordingly, the crosslinking agents which can be used are those commonly known in the art, such as organic peroxides (for example such as : 1,1 -Di(tert.butylperoxy)-3,3,5-trimethyl cyclohexane; Dicetyl peroxydicarbonate ; tert.Butyl-per-2-ethyl hexanoate), preferably having a half-life of the order of 10-200 seconds in the above mentioned temperature range. The polymers or compositions of the invention can be impregnated with an oil extender for regulating their hardness, either before the addition of the crosslinking agent or at the start or end of vulcanization. The oil extender used can be of various types, for example aromatic, naphthenic or, preferably, paraffinic. As coadjuvant compounds for the crosslinking, liquid 1,2-polybutadiene or preferably compounds of the triallyl cyanurate and of trimethylol-propan-trimethacrylate type can be used.

The butene-1 (co)polymers of the present invention can be prepared by polymerization of the monomers in the presence of a low stereospecificity catalyst comprising (A) a solid component comprising a Ti compound and an internal electron-donor compound supported on $MgCl_2$; (B) an alkylaluminum compound. In a preferred aspect of the process for the preparation of the (co)polymers of the invention the external electron donor compound is not used in order not to increase the stereoregulating capability of the catalyst. In cases in which the external donor is used, its amount and modalities of use should be such as not to generate a too high amount of highly stereoregular polymer.

Magnesium dichloride in active form is preferably used as a support. It is widely known from the patent literature that magnesium dichloride in active form is particularly suited as a support for Ziegler-Natta catalysts. In particular, U.S. Pat. Nos. 4,298,718 and 4,495,338 were the first to describe the use of these compounds in Ziegler-Natta catalysis. It is known from these patents that the magnesium dihalides in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is displaced towards lower angles relative to that of the more intense line.

The preferred titanium compounds used in the catalyst component of the present invention are $TiCl_4$ and $TiCl_3$; furthermore, also Ti-haloalcoholates of formula $Ti(OR)_{n-y}X_y$, where n is the valence of titanium, X is halogen, preferably chlorine, and y is a number between 1 and n, can be used.

The internal electron-donor compound is preferably selected from esters and more preferably from alkyl, cycloalkyl or aryl esters of monocarboxylic acids, for example benzoic acids, or polycarboxylic acids, for example phthalic or succinic acids, the said alkyl, cycloalkyl or aryl groups having from 1 to 18 carbon atoms. Examples of the said electron-donor compounds are diisobutyl phthalate, diethylphtahalate and dihexylphthalate. Generally, the internal electron donor compound is used in molar ratio with respect to the $MgCl_2$ of from 0.01 to 1 preferably from 0.05 to 0.5.

The preparation of the solid catalyst component can be carried out according to several methods.

According to one preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula MgCl$_2$.pROH, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. Nos. 4,399,054 and 4,469,648. The so obtained adduct can be directly reacted with the Ti compound or it can be previously subjected to thermal controlled dealcoholation (80-130° C.) so as to obtain an adduct in which the number of moles of alcohol is generally lower than 3 preferably between 0.1 and 2.5. The reaction with the Ti compound can be carried out by suspending the adduct (dealcoholated or as such) in cold TiCl$_4$ (generally 0° C.); the mixture is heated up to 80-130° C. and kept at this temperature for 0.5-2 hours. The treatment with TiCl$_4$ can be carried out one or more times. The internal electron donor compound can be added during the treatment with TiCl$_4$. The treatment with the electron donor compound can be repeated one or more times.

The preparation of catalyst components in spherical form is described for example in European Patent Applications EP-A-395083, EP-A-553805, EP-A-553806, EPA-601525 and WO98/44001.

The solid catalyst components obtained according to the above method show a surface area (by B.E.T. method) generally between 20 and 500 m$^2$/g and preferably between 50 and 400 m$^2$/g, and a total porosity (by B.E.T. method) higher than 0.2 cm$^3$/g preferably between 0.2 and 0.6 cm$^3$/g. The porosity (Hg method) due to pores with radius up to 10.000 Å generally ranges from 0.3 to 1.5 cm$^3$/g, preferably from 0.45 to 1 cm$^3$/g.

The alkyl-Al compound (B) is preferably chosen among the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as AlEt$_2$Cl and Al$_2$Et$_3$Cl$_3$.

If used the external donors (C) are preferably selected among silicon compounds of formula R$_a^5$R$_b^6$Si(OR$^7$)$_c$, where a and b are integer from 0 to 2, c is an integer from 1 to 3 and the sum (a+b+c) is 4; R$^5$, R$^6$, and R$^7$, are alkyl, cycloalkyl or aryl radicals with 1-18 carbon atoms optionally containing heteroatoms. A particularly preferred group of silicon compounds is that in which a is 0, c is 3, b is 1 and R$^6$ is a branched alkyl or cycloalkyl group, optionally containing heteroatoms, and R$^7$ is methyl. Examples of such preferred silicon compounds are cyclohexyltrimethoxysilane, t-butyltrimethoxysilane and thexyltrimethoxysilane. The use of thexyltrimethoxysilane is particularly preferred.

If used the external electron donor compound (C) is fed in such an amount to give a weight ratio between the organoaluminum compound and said electron donor compound of from higher than 500 preferably higher than 700.

It is also possible to pre-polymerize said catalyst in a pre-polymerization step. Said prepolymerization can be carried out in liquid, (slurry or solution) or in the gas-phase, at temperatures generally lower than 100° C., preferably between 20 and 70° C. The pre-polymerization step is carried out with small quantities of monomers for the time which is necessary to obtain the polymer in amounts of between 0.5 and 2000 g per g of solid catalyst component, preferably between 5 and 500 and, more preferably, between 10 and 100 g per g of solid catalyst component.

The polymerization process can be carried out according to known techniques, for example slurry polymerization using as diluent a liquid inert hydrocarbon, or solution polymerization using for example the liquid butene-1 as a reaction medium. Moreover, it may also be possible to carry out the polymerization process in the gas-phase, operating in one or more fluidized or mechanically agitated bed reactors. The polymerization carried out in the liquid butene-1 as a reaction medium is highly preferred.

The polymerization is generally carried out at temperature of from 20 to 120° C., preferably of from 40 to 90° C. The polymerization can be carried out in one or more reactors that can work under same or different reaction conditions such as concentration of molecular weight regulator, comonomer concentration, external electron donor concentration, temperature, pressure etc. When two or more are employed the set up can be in the cascade mode where monomer/catalyst/polymer reaction mixture coming from the first reactor is fed to the successive one. Alternatively, in the parallel set up, two or more reactors with their own feeding systems work independently and the monomer/catalyst/polymer reaction mixture coming from these reactors are collected together and directed to the finishing section. Working in at least two reactors under different conditions can lead to the preparation of butene-1 (co)polymers with different average molecular weight and/or different stereoregularity in the two reactors. Moreover, working in more than one reactor under different conditions has the advantage that the various polymerization stages can be properly modulated so as to properly tailoring the properties of the final polymer. This technique can be adopted when products having a very high amount of xylene soluble fractions are to be produced. These products in fact, can give problems during certain operations such as pelletization. The applicant noted that producing two polymers having a different content of xylene insoluble fraction in two distinct reactor in series gives raise to a final polymer that is better processable than the product deriving from only one polymerization stage having the same amount of final xylene insoluble fraction. This can be done for example by using only in one or more selected reactors a small amount of external donor that allows the catalyst to be more stereospecific. The (co)polymer obtained from the two-stage polymerization can have the same uses as the copolymer obtained via a single set of polymerization conditions. As mentioned above, the copolymers of the invention are suitable for use in many applications. As a customary routine, for each of these applications the relevant experts can add further polymer components, additives (such as stabilizers, antioxidants, anti-corrosives, nucleating agents, processing aids, oils, etc.) and both organic and inorganic fillers which can impart specific properties, without departing from the gist of the invention.

The following examples are given in order to better illustrate the invention without limiting it.

Characterization

Comonomer Content $^{13}$C NMR Analysis $^{13}$C-NMR spectra were performed on a polymer solution (8-12 % wt) in dideuterated 1,1,2,2-tetrachloro-ethane at 120° C. The $^{13}$C-NMR spectra were acquired on a Bruker DPX-400 spectrometer operating at 100.61 MHz in the Fourier transform mode at 120 ° C. using a 90° pulse, 15 seconds of delay between pulses and CPD (WALTZ16) to remove $^1$H-$^{13}$C coupling. About 1500-2000 transients were stored in 32K data points using a spectral window of 60 ppm (0-60ppm).

Comonomer Content in Butene/propylene Copolymers

The propylene content was obtained from the triad distribution ([P]=[PPP]+[PPB]+[BPB]) which is calculated as:

$$BBB = M/\Sigma \quad BBP = L/\Sigma \quad PBP = I/\Sigma$$
$$BPB = 0.5D/\Sigma \quad BPP = [A + 0.5(B + E)]/\Sigma \quad PPP = (C + 0.5B)/\Sigma$$

Where $\Sigma$=M+L+I+0.5D+[A+0.5(B+E)]+(C+0.5B) and A, B, C, D, E, I, L, M are the integrals of the peaks in the $^{13}$C-NMR spectrum (The peak at 27.73 ppm due the CH$_2$ carbon in the branch of an isotactic BBBBB pentad is used as internal reference). The assignment of these peaks are made according to H. N. Cheng, *Journal of Polymer Science, Polymer Physics Edition*, 21, 573 (1983) and are reported in Table A.

TABLE A

| Area | Chemical Shift | Assignments | Sequence |
|---|---|---|---|
| A | 47.15 | CH$_2$ chain | BPPB |
| B | 46.83 | CH$_2$ chain | PPPB |
| C | 46.52 | CH$_2$ chain | PPPP |
| D | 43.67 | CH$_2$ chain | BPBX |
| E | 43.37 | CH$_2$ chain | PPBX |
| I | 28.13 | CH$_2$ branch | PBP |
| L | 27.93 | CH$_2$ branch | BBP |
| M | 27.73 | CH$_2$ branch | BBB |

Determination of mmmm % by $^{13}$C NMR

The assignment of the pentad signals in the region of branch methylene carbons was made according to *Carbon-13 NMR Spectral Assignment of Five Polyolefins Determined from the Chemical Shift Calculation and the Polymerization Mechanism, T Asakura and others, Macromolecules* 1991, 24 2334-2340.

Due to the superimposition between stereoirregular pentads, the mmmm pentad was obtained by fitting the experimental pentad distribution with the two-site model described in *Two-site model analysis of $^{13}$C NMR of polypropylene polymerized by Ziegler-Natta catalyst with external alkoxysilane donors*, R. Chûjô, Y Kogure, T Väänänen, Polymer, 1994, 35, 339-342. The mmmm % reported in Table 1 corresponds to the value obtained in the best fit procedure.

Determination of 4,1 Inserted Butene Units

In the case of either butene homopolymers or butene/propylene copolymers the amount of 4,1 inserted butene units is checked via $^{13}$C-NMR spectroscopy using the above-mentioned experimental conditions. Assignments of 4,1 inserted units are made according to V. Busico, R. Cipullo, A. Borriello, *Macromol. Rapid. Commun.* 16, 269, (1995) and are reported in Table B.

TABLE B

| Peak | Chemical Shift (ppm) | Carbon | Sequence |
|---|---|---|---|
| Q | 37.3 | CH | —CH(CH$_2$CH$_3$)—(CH$_2$)$_5$—CH(CH$_2$CH$_3$)— |

MWD Determination by Gel Permeation Chromatography (GPC)

This is determined using a Waters 150-C ALC/GPC system equipped with a TSK column set (type GMHXL-HT) working at 135° C. with 1,2-dichlorobenzene as solvent (ODCB) (stabilized with 0.1 vol. of 2,6-di-t-butyl p-cresole (BHT)) at flow rate of 1 ml/min. The sample is dissolved in ODCB by stirring continuously at a temperature of 140° C. for 1 hour. The solution is filtered through a 0.45μm Teflon membrane. The filtrate (concentration 0.08-1.2g/l injection volume 300μl) is subjected to GPC. Monodisperse fractions of polystyrene (provided by Polymer Laboratories) were used as standard. The universal calibration for PB copolymers was performed by using a linear combination of the Mark-Houwink constants for PS (K=7.11×10$^{-5}$ dl/g; α=0.743) and PB (K=1.18×10$^{-4}$ dl/g; α=0.725)

Thermal Properties

The melting points of the polymers (T$_m$) were measured by Differential Scanning Calorimetry (D.S.C.) on a Perkin Elmer DSC-7 instrument, according to the standard method. A weighted sample (5-7 mg) obtained from the polymerization was sealed into aluminum pans and heated to 180° C. at 10° C./minute. The sample was kept at 180° C. for 5 minutes to allow a complete melting of all the crystallites, then cooled to 20° C. at 10° C./minute. After standing 2 minutes at 20° C., the sample was heated for the second time to 180° C. at 10° C./min. In this second heating run, the peak temperature was taken as the melting temperature (T$_m$) and the area of the peak as melting enthalpy (ΔH$_f$).

Determination of Shore A and D

Measured According to ASTM D2240

Tensile Properties

Measured according to ISO 527-Tensile on a 1.9 mm thick plaque obtained by compression molding (at 200° C. with an cooling of 30°/min) of a polymer composition obtained by mixing in a Brabender the relevant copolymer sample with 1% 2,6- di-t-butyl-4-methyl phenol (BHT) at 180° C. Except where otherwise stated all mechanical measurements have been carried out after the specimens have been kept for 10' in autoclave at room temperature and 2 kbar pressure.

Compression Set

Measured according to ASTM D395B type 1 on compression molded samples that have been treated for 1 minute in autoclave at room temperature and 2 kbar. The so obtained specimens were compressed 25% of the original thickness and put in an oven at 70° C. or 23° C. for 22 hours.

Determination of Xylene Insoluble Fraction

In order to determine the fraction insoluble in xylene at 0° C. (X.I.%), 2.5 g of polymer are dissolved under agitation in 250 ml of xylene at 135° C., and after 20 minutes it is allowed to cool to 0° C. After 30 minutes the precipitated polymer is filtered and dried at reduced pressure at 80° C. until constant weight is reached.

Intrinsic Viscosity [η]

Determined in tetrahydronaphthalene at 135° C. (ASTM 2857-70).

Determination of Diethyl Ether Soluble Fraction

In order to determine the fraction soluble in diethyl ether, the polymer was extracted according to Kumagawa procedure. In an inert atmosphere, 2 g of polymer are transferred in a cellulose thimble and suspended with a glass cylinder over 300 mL of diethyl ether. The ether is warmed at the reflux temperature and the vapours, condensed in a buble condenser, continuously drop on the polymer. In this way the polymer is constantly covered by the solvent and the extraction temperature is practically equal to the ether reflux temperature.

The extraction is conducted for 15 hours. The soluble fraction is recovered by adding methanol (600 mL) to the ether solution. After 30 minutes the precipitated polymer is filtered and dried at reduced pressure at 80° C. until constant weight is reached.

Milling Procedure 40 g of polymer are introduced in a Brabender 2100 having a chamber size of 55 cm$^3$, and subject to mixing conditions at a temperature of 140° C., for 5' at 90 rpm. After that the polymer is discharged and subject to additional tests.

EXAMPLES

Preparation of Solid Catalyst Component

Into a 500 ml four-necked round flask, purged with nitrogen, 225 ml of TiCl$_4$ were introduced at 0C. While stirring, 6.8 g of microspheroidal MgCl$_2$.2.7C$_2$H$_5$OH (prepared as described in Ex. 2 of U.S. Pat. No. 4,399,054 but operating at 3,000 rpm instead of 10,000) were added. The flask was heated to 40° C. and 4.4 mmoles of diisobutylphthalate were thereupon added. The temperature was raised to 100° C. and maintained for two hours, then stirring was discontinued, the solid product was allowed to settle and the supernatant liquid was siphoned off.

200 ml of fresh TiCl$_4$ were added, the mixture was reacted at 120° C. for one hour then the supernatant liquid was siphoned off and the solid obtained was washed six times with anhydrous hexane (6×100 ml) at 60° C. and then dried under vacuum. The catalyst component contained 2.8 wt % of Ti and 12.3 wt % of phthalate.

Example 1

In a 4 liter autoclave, purged with nitrogen flow at 70° C. for one hour, 75 ml of anhydrous hexane containing 7 mmols of AliBu$_3$, and 20 mg of solid catalyst component prepared as reported above were introduced in nitrogen flow at 30° C. The autoclave was closed and then, under stirring, 1.3 Kg of liquid butene-1 were fed. The temperature was raised to 70° C. in five minutes and the polymerization was carried out at this temperature for 2 hours. After that time the reaction was stopped, the unreacted butene-1 was vented and the polymer was recovered and dried at 70 ° C. under vacuum for six hours. The polymerization activity was 13 Kg polymer/g catalyst. The final polybutene-1 product had the characteristics reported in Tab. 1. No 4,1-butene inserted units were detected by $^{13}$C NMR.

Example 2

The preparation described in Example 1 was repeated with the difference that 100 cm$^3$ of H$_2$ were fed to the polymerization bath. The final polybutene-1 product had the characteristics reported in Tab. 1. No 4,1-butene inserted units were detected by $^{13}$C NMR.

Example 3

The preparation described in Example 1 was repeated with the difference that 250 cm$^3$ of H$_2$ were fed to the polymerization bath. The final polybutene-1 product had the characteristics reported in Tab. 1. No 4,1-butene inserted units were detected by $^{13}$C NMR.

Example 4

The preparation described in Example 1 was repeated with the difference that the polymerization temperature was set at 80° C. The final polybutene-1 product had the characteristics reported in Tab. 1. No 4,1-butene inserted units were detected by $^{13}$C NMR.

Example 5

The preparation described in Example 4 was repeated with the difference that 100 cm$^3$ of H$_2$ were fed to the polymerization bath. The final polybutene-1 product had the characteristics reported in Tab. 1. No 4,1-butene inserted units were detected by $^{13}$C NMR.

Example 6

Preparation of Butene-1 Homopolymer by Sequential Polymerization

The sequential polymerization was carried out in two liquid-phase stirred reactors connected in series in which liquid butene-1 constituted the liquid medium. The same catalyst described in the previous examples was used. The catalyst components (Al-alkyl/cat weight ratio 38) were precontacted at 10° C. and then injected into the first reactor working at 75° C. without hydrogen being fed. After 170 minutes of polymerization the content of the first reactor was transferred into the second reactor where the polymerization continued under the same conditions. The polymerization was stopped after 100 minutes and the final polymer was collected and characterized. On the basis of the polymerization activity, about 70% of the total polymer was produced in the first polymerization step and showed a xylene insoluble fraction of 30%. The results of the characterization carried out on the final copolymer are reported in Table 1.

Example 7

Preparation of Butene-1 Homopolymer by Sequential Polymerization

The same set up and catalyst described in Example 6 was used. In this run the weight ratio Al-alkyl/cat weight ratio was 40 and the first reactor worked at 75° C. without hydrogen being fed. After 150 minutes of polymerization the content of the first reactor was transferred into the second reactor where also thexyltrimethoxysilane as external donor was used at Tibal/donor weight ratio of 950. The polymerization continued in the second reactor for 100 minutes, then was stopped and the final polymer was collected and characterized. On the basis of the polymerization activity, about 75% of the total copolymer was produced in the first polymerization step and showed a xylene insoluble fraction of 28%. The xylene insoluble fraction of whole polymer was 35%. The results of the characterization carried out on the final copolymer are reported in Table 1 The Shore D value was lower than 30.

Example 8

Preparation of Butene-1/Propylene Copolymer

The preparation described in Example 1 was repeated with the difference that 10 g of propylene were fed after feeding of butene-1. During polymerization the pressure was kept constant by feeding propylene. The final polymer, the characterization of which is reported in Table 1, contained 2.6% wt (NMR determination) of propylene.

Example 9

Preparation of Butene-1/Hexene Copolymer

The preparation described in Example 1 was repeated with the difference that 125 g of hexene-1 were fed before feeding of butene-1 and the polymerization temperature was 75° C. The final polymer, the characterization of which is reported in Table 1, contained 4.3% wt (NMR determination) of hexene-1. The DSC analysis showed no melting peak.

Example 10

Preparation of Butene-1/Ethylene Copolymer

The preparation described in Example 1 was repeated with the difference that 3 g of ethylene were fed after feeding of butene-1. During polymerization the pressure was kept constant by feeding ethylene. The final polymer, the characterization of which is reported in Table 1, contained 0.9% wt (NMR determination) of ethylene. The DSC analysis showed no melting peak.

Example 11

Preparation of Butene-1/Ethylene Copolymer

The preparation described in Example 10 was repeated with the difference that 28 g of ethylene were fed after feeding of butene-1 and the polymerization temperature was 75° C. The final polymer, the characterization of which is reported in Table 1, contained 10.1% wt (NMR determination) of ethylene. The DSC analysis showed no melting peak.

Example 12

Preparation of Butene-1/Ethylene/Propylene Terpolymer

The preparation described in Example 10 was repeated with the difference that 3 g of ethylene and 5 g of propylene were fed after feeding of butene-1. During polymerization, the pressure was kept constant by feeding a 2/1 g/g ethylene/propylene mixture. The final polymer, the characterization of which is reported in Table 1, contained 1.1% wt of ethylene and 0.9% of propylene. The DSC analysis showed no melting peak.

Example 13

Preparation of Butene-1/Propylene/Hexene Terpolymer

The preparation described in Example 13 was repeated with the difference that 5 g of propylene were fed after feeding butene-1. During polymerization the pressure was kept constant by feeding propylene. The final polymer, the characterization of which is reported in Table 1, contained 5.6% wt (NMR determination) of propylene and 4% wt of hexene. The DSC analysis showed no melting peak.

Example 14

A mechanical blend comprising 90% bw of the butene-1 homopolymer of example 7 and 10% of a propylene terpolymer having a melting point of 133° C. containing 3.2% wt of ethylene, 6% bw of butene-1 and a MFR (230° C. 2.16 kg) of 5.5 was prepared. The film obtained from this composition was transparent, with a Flexural Modulus of 13 Mpa, a MFR (230° C. 2.16 kg) of 1.2 and an elongation at break of 512%.

Example 15

38 g of the polymer obtained as disclosed in Example 7 were introduced into an internal mixer of the Banbury type at a temperature of 90° C. together with 2 g of Dicetyl peroxydicarbonate. The mixture was mixed for 6 minutes at 60 rpm for the dynamic crosslinking of the product. 30 g of mixture were then moulded in a plate (compression moulding at 180° C. for 7 minutes) and subject to compression set test according to the method set forth above, but without autoclave ageing. The compression set was 39%.

Example 16

38 g of the polymer obtained as disclosed in Example 7 was introduced into an internal mixer of the Banbury type at a temperature of 140° C. together with 1.6 g of a Triallylcyanurate/Silica blend (50/50) and 0.4 g of a 1,1-Di(tert.butylperoxy)-3,3,5-trimethyl cyclohexane/Silica blend (40/60). The mixture was mixed for 6 minutes at 60 rpm for the dynamic crosslinking of the product. 30 g of mixture were then moulded in a plate (compression moulding at 180° C. for 7 minutes) and subject to compression set test according to the method set forth above, but without autoclave ageing. The compression set was 48%.

TABLE 1

| | | Ex | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| X.I. | % wt | 11.3 | 35.3 | 37.9 | 19 | 40.4 | 37 | 35 | 3.1 | 6 | 28.2 | 22.9 | 7.3 | 20.6 |
| [η] | dL/g | 2.61 | 2.58 | 2.21 | 2.2 | 1.81 | 2.55 | 2.5 | 2.68 | 2.7 | 2.5 | 1.7 | 3 | 2.34 |
| ES2/ES1 | | >1 | >1 | >1 | >1 | >1 | >1 | >1 | >1 | >1 | >1 | >1 | >1 | >1 |
| Tm | °C. | — | 103 | 102.5 | 98.6 | 101.1 | 105.7 | nm | 81.5 | Nd | Nd | Nd | Nd | Nd |
| ΔH | J/g | 6.9 | 8.1 | 8.2 | 4.1 | 8.5 | nm | nm | 2.5 | Nd | Nd | Nd | Nd | Nd |
| mmmm | % | 35 | 44.2 | 44.4 | 35.2 | 38.3 | 51.7 | nm | 37 | 38.8 | 43.9 | 50.2 | 38.5 | 37.7 |
| M.I. "E" | g/10' | 0.36 | 0.33 | 0.58 | 0.58 | 0.81 | 0.5 | 0.4 | nm | nm | nm | nm | nm | nm |
| Tens. Str. At break | MPa | 8.3 | 12.1 | 13.8 | 8.1 | 9.3 | 12.5 | 12 | 4.4 | 7 | nm | nm | 6.7 | 6.3 |
| Elong at break | % | 715 | 605 | 485 | 810 | 660 | 490 | 420 | 440 | >500 | nm | nm | 670 | 703 |
| Compr. set (RT) | % | 72 | 80 | 34 | 30 | | 76 | 42 | nm | nm | nm | nm | nm | nm |

TABLE 1-continued

| | | Ex | | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 | 13 |
| Compr. Set (70° C.) | % | — | | | | | | 41 | 77 | 70 | nm | nm | 63 | 88 |
| Shore A | | 56.5 | 71 | 68 | 57 | 64 | 76 | 77 | 64 | 56 | nm | nm | 60 | 34 | nm = not measured
nd = peak not detected-amorphous polymer

The invention claimed is:

1. Butene-1 homo or copolymers comprising:
a content of butene-1 units in the form of isotactic pentads (mmmm) from 25 to 55%;
an intrinsic viscosity [η] measured in tetraline at 135° C. from 1 to 3;
a content of xylene insoluble fraction at 0° C. from 3 to 60% of the total weight of the polymer; and
a ratio $ES_2/ES_1 \geq 1$, where $ES_1$ is the amount of boiling diethyl ether soluble fraction determined on the polymer as such and $ES_2$ is the amount of boiling diethyl ether soluble fraction determined after milling the polymer.

2. The butene-1 homo or copolymers according to claim 1 wherein the content of butene-1 units in the form of isotactic pentads (mmmm) is from 30 to 50%.

3. The butene-1 homo or copolymers according to claim 1 wherein the content of xylene insoluble fraction at 0° C. is from 5 to 50% of the total weight of the polymer.

4. The butene-1 homo or copolymers according to claim 1 wherein the intrinsic viscosity [η] ranges from 1.5 to 3.

5. The butene-1 homo or copolymers according to claim 1 further comprising a Mw/Mn value ranging from 3.5 to 9.

6. The butene-1 homo or copolymers according to claim 1 wherein the content of boiling diethyl ether soluble fraction ($ES_1$) is from 20 to 75%.

7. The butene-1 homo or copolymers according to claim 1 further comprising a stress at break higher than 6 MpA and a Shore A lower than 80.

8. A butene-1 copolymer comprising:
at least one olefin of formula $CH_2$=CHR where R is H or a C1-C10 alkyl different from ethyl;
a content of butene-1 units in the form of isotactic pentads (mmmm) from 25 to 55%;
an intrinsic viscosity [η] measured in tetraline at 135° C. from 1 to 3;
a content of xylene insoluble fraction at 0° C. from 3 to 60% of the total weight of the polymer; and
a ratio $ES_2/ES_1 \geq 1$, where $ES_1$ is the amount of boiling diethyl ether soluble fraction determined on the polymer as such and $ES_2$ is the amount of boiling diethyl ether soluble fraction determined after milling the polymer.

9. A polymer composition comprising:
(A) from 1 to 99% by weight of the butene-1 (co)polymer comprising:
a content of butene-1 units in the form of isotactic pentads (mmmm) from 25 to 55%;
an intrinsic viscosity [η] measured in tetraline at 135° C. from 1 to 3;
a content of xylene insoluble fraction at 0° C. from 3 to 60% of the total weight of the polymer; and
a ratio $ES_2/ES_1 \geq 1$, where $ES_1$ is the amount of boiling diethyl ether soluble fraction determined on the polymer as such and $ES_2$ is the amount of boiling diethyl ether soluble fraction determined after milling the polymer; and
(B) from 99% to 1% by weight of another polymeric component;
said percentages being based on the sum of (A)+(B).

10. A process for the preparation of a butene-1 copolymer comprising:
at least one olefin of formula $CH_2$=CHR where R is H or a C1-C10 alkyl different from ethyl;
a content of butene-1 units in the form of isotactic pentads (mmmm) from 25 to 55%;
an intrinsic viscosity [η] measured in tetraline at 135° C. from 1 to 3;
a content of xylene insoluble fraction at 0° C. from 3 to 60% of the total weight of the polymer; and
a ratio $ES_2/ES_1 \geq 1$, where $ES_1$ is the amount of boiling diethyl ether soluble fraction determined on the polymer as such and $ES_2$ is the amount of boiling diethyl ether soluble fraction determined after milling the polymer,
the process comprising polymerizing butene-1 in the presence of a catalyst system comprising (A) a solid component comprising a Ti compound and an internal electron-donor compound supported on $MgCl_2$; and (B) an organoaluminum compound.

11. The process according to claim 10 further comprising an external electron donor component (C) in such an amount to give a weight ratio between the organoaluminum compound and said external electron donor component of from higher than 500.

12. The process according to claim 11 carried out in more than one reactor working under different polymerization conditions.

13. The process according to claim 12 carried out in two reactors wherein an external donor is used only in one reactor.

* * * * *